Sept. 13, 1927.  C. W. WALTZ  1,642,049
SHOCK ABSORBER
Filed Jan. 2, 1925   2 Sheets-Sheet 1

Inventor
Clarence W. Waltz
By Bates, Macklin, Goldrick & Fears
Attorneys

Sept. 13, 1927.
C. W. WALTZ
SHOCK ABSORBER
Filed Jan. 2, 1925
1,642,049
2 Sheets-Sheet 2
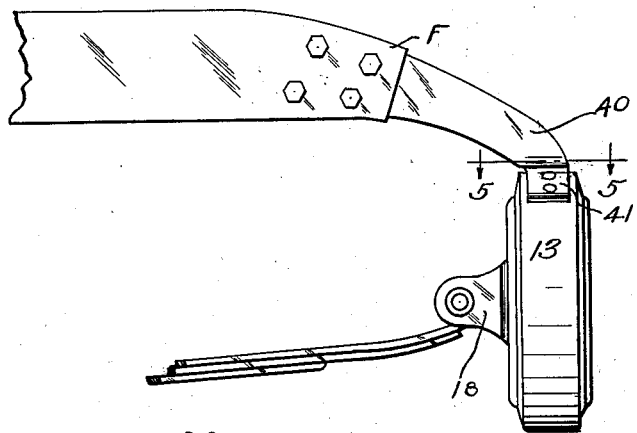
FIG-3
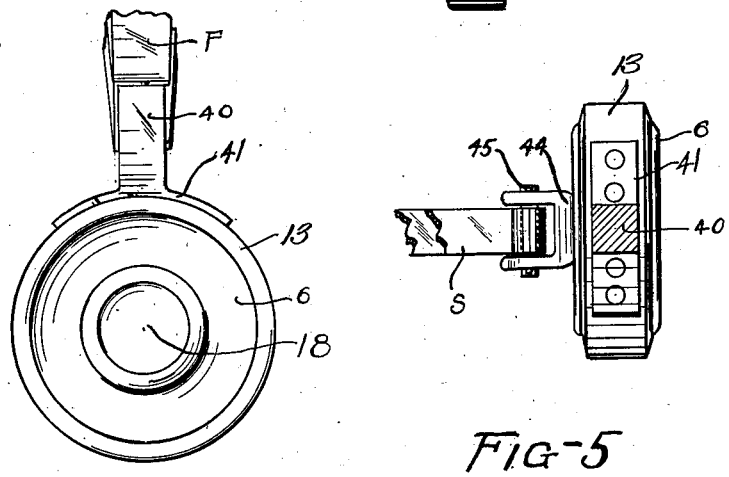
FIG-5
FIG-4
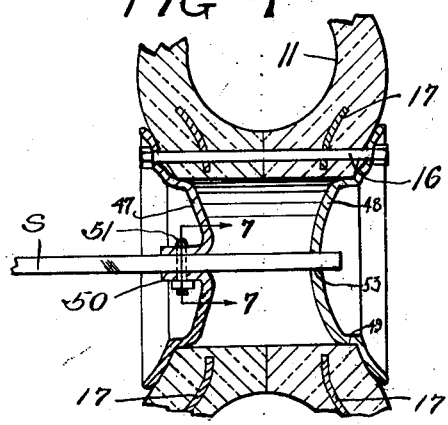
FIG-6
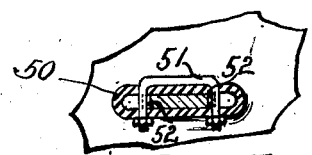
FIG-7
Inventor
Clarence W. Waltz
By Bates, Macklin, Goldrick & Dean
Attorneys Patented Sept. 13, 1927.

1,642,049

UNITED STATES PATENT OFFICE.

CLARENCE W. WALTZ, OF CLEVELAND, OHIO.

SHOCK ABSORBER.

Application filed January 2, 1925. Serial No. 100.

This invention relates to pneumatic devices for lessening the shock between relatively movable members particularly such as have irregular or variable movements. The general object of the invention is to provide a pneumatic shock absorber which may be adapted to be used as a universal driving connecting member between a propeller shaft and an engine shaft of an automobile or which may be similarly adapted to other uses, such as a spring shackle in connection with the usual automobile body supporting spring and the car frame.

Another object is to provide a pneumatic device of this character which may be very easily assembled and taken apart, which will have the desired strength consistent with lightness of construction and which may be easily inflated to the desired amount depending upon its use.

Other objects and features will become apparent in the further description of the invention which relates to the accompanying drawing wherein I have shown the preferred form of my invention. The essential novel characteristics are summarized in the claims.

Figure 1:
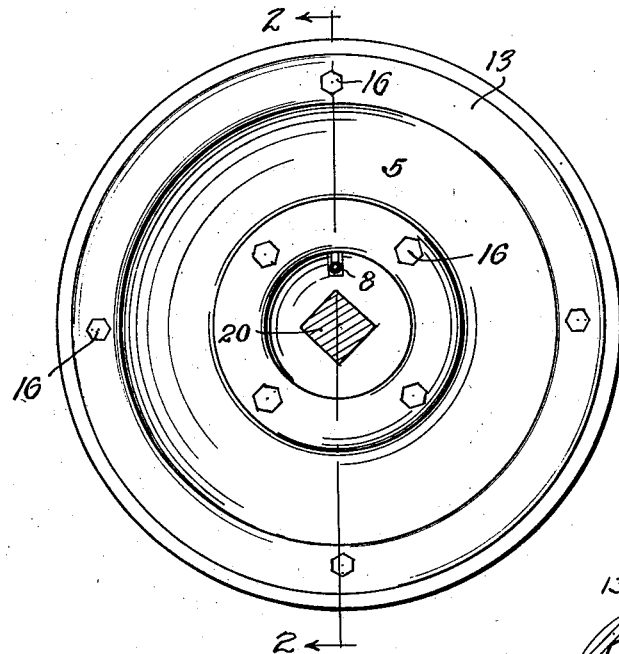
Figure 8:
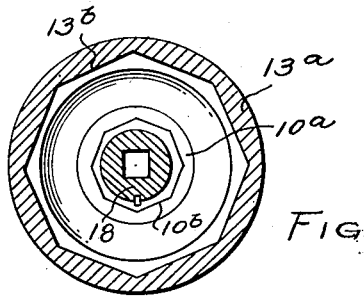
Figure 2:
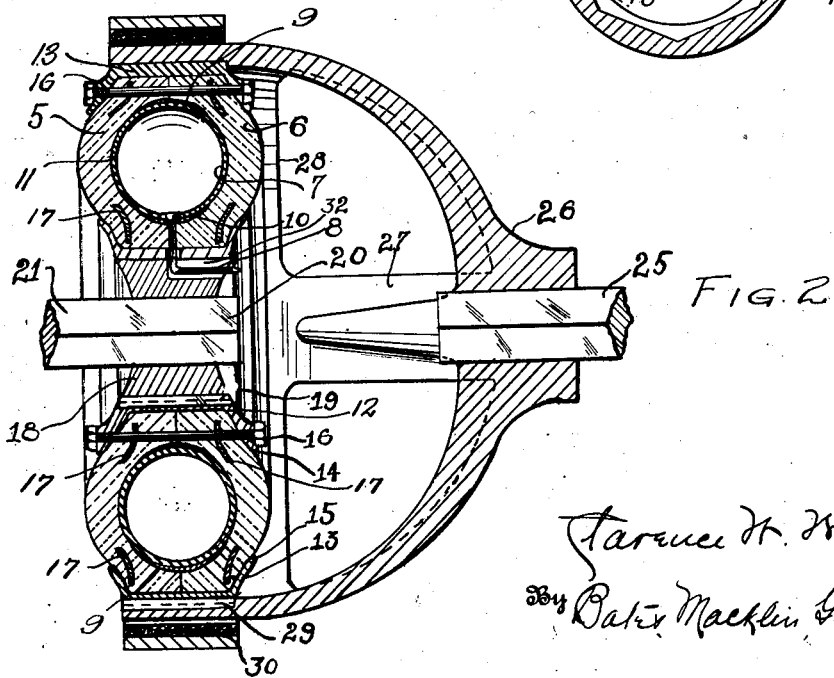

In the drawings Fig. 1 is an end elevation of my device; Fig. 2 is a longitudinal central section therethrough as indicated by the line 2—2 in Fig. 1; Fig. 3 illustrates my invention adapted to form a shackle for an automobile spring. Fig. 4 is an end elevation thereof; Fig. 5 is a sectional plan as indicated by the line 5—5 on Fig. 3. Fig. 6 is a modified form of the inner retaining rim for the casing, shown adapted to receive the free end of a leaf spring. Fig. 7 is a fragmentary section taken on the line 7—7 of Fig. 6. Fig. 8 is a longitudinal central cross-section through a modified form of my invention.

My invention in general embodies a relatively heavy pliable reinforced casing for a pneumatic tube preferably made in two parts and adapted to be held in place by internal and external flanged members embracing edges or beads formed on the casing members. In case the device is used for a universal driving connection between a pair of driving and driven members, I provide fastening members which extend from the metallic rim members into each of the members comprising the casing or wall and preferably through metal reinforcing rings or plates embedded in the casing. In this connection, it may be remarked that the exterior flanged member may be adapted to form a braking surface to cooperate with the usual brake band construction. The connections with the interior and exterior rim members are substantially the same for any use of the device except of course that adapters would have to be provided suitable for fastening it to various forms of members to be connected.

Referring in detail to the drawings, particularly to Figs. 1 and 2, the two parts of the casing are indicated at 5 and 6. In my preferred construction the abutting edges of each of these side wall members match and are adapted to be held in close relation throughout their entire extent. Positioned to lie within the circular recess 11 I provide a tube 7 having a valve stem 8, which in the form shown lies between slight recesses in the abutting faces of the casing members. Strips of fabric shown at 9 and 10 corresponding to the usual tire flaps may be provided to prevent the tube from entering any recess which might occur between the members 5 and 6.

The rim members which I have shown at 12 and 13 have outwardly and inwardly extending flanges 14 and 15 respectively, which preferably extend for some distance along the walls depending upon the specific purpose which the device is to serve. Especially in case of the adaptation shown in Fig. 2, the abutting portions of the members 5 and 6 are provided with perforations which are made to align with openings in the members 14 and 15 to enable the casing to be made rigid with the rim as by through bolts or pins 16 thus preventing any creeping between the casing and the rim when connected to driving members as shown. I prefer to provide reinforcing rings or plates in the body of each of the casing members shown at 17 which may have scored surfaces to prevent any relative movement between the casing and the rings and into which the bolts 16 extend thus preventing undue strain on the material forming the body of the casing.

To adapt the device to serve as a universal driving connection, I have shown a cylindrical member 18 keyed to the interior surface of the rim 12 at 19, the cylindrical member receiving the angularly formed end 20 of one of a pair of driving and driven members 21. To establish a rigid connection between the cooperating member, indicated at 25, I have shown a spider 26 similarly secured to the shaft and having a plurality of arms 27 suitably braced and terminating in a closed ring 28 which may be secured to the rim in any manner as by the key 29. This closed ring, as shown in this embodiment is circular and if desired may serve the purpose of a brake drum cooperating with a brake band or shoe indicated at 30.

If desired I may eliminate the through bolts by making my shock absorber as shown in Figure 8. This figure shows the interior of the outer flanged adapter member 13$^a$ as being provided with an angularly formed inner periphery indicated at 13$^b$. The inner flanged member 10$^a$ has outer angularly formed peripheral surfaces 10$^b$. The inner and outer peripheral edges of the casing are, of course, made to substantially fit the angularly formed surfaces on the flanged members. Thus relative slippage is prevented between the resilient casing and both the inner and outer flanged members without necessitating the penetration of the casing walls.

To assemble the device or to take it apart whenever it is desired several courses may be followed. Preferably in the adaptation shown in Fig. 2, I first deflate the tube, remove the through bolts and then shove either the members 18 or 27 along its respective shaft 21 or 25. The other rim and adapter member remaining stationary, the two parts of the casing will be found to easily free themselves of both rim members, the cut away portion 32 of the member 18 allowing sufficient freedom of movement to the valve stem to prevent its being damaged. In reassembling the casing and tube, it will be found easiest to double or fold the edges of the two halves toward each other before putting them into place in the rim.

As an example of other uses of the device I have shown in Figs. 3 to 5 brackets 40 in place of the spider member 27 which may be bolted or otherwise securely fastened to a frame member F of the car. The lower end of the bracket may terminate in outwardly extending curved flanges 41 adapted to be bolted or riveted to the member 13. In place of the central member 18 of Fig. 2, the construction would necessarily be changed to a spring adapter, the preferred form which I use being the short bifurcated arm or bracket 44 adapted to receive a pin 45 which passes through the eye of a spring S.

In Figs. 6 and 7 I have shown such a modified form of inner retaining member as is especially adapted to the second described form of my invention. I obviate the necessity for the member 18 by making the retaining rims a part of concave discs 47 and 48 shouldered at 49 to support the bead portions of the casing. The through bolts 16 may hold these discs tightly in place by gripping the beads. One of the discs I provide with a flanged member 50 preferably upstruck from the blank forming the disc and having openings adapted to receive the legs of a U bolt 51 or similar means which may enter holes 52 or notches in a leaf of the spring S. The free end of the spring may extend through an opening 53 in the other disc. This may provide a non-lubricated shackle for a spring which would dispense with oilers and grease cups at this point.

It will be seen that I have provided a very simple arrangement for receiving and absorbing the shock between a pair of rotatable members, a spring and a frame or any relatively movable members which have irregular movements. The device moreover may be very easily and cheaply manufactured for quantity production by following well known practices of manufacturing tubes and tires. The flanged members may be made by simple drawing operations and the adapters easily forged or cast.

In the use of the various forms in which my invention may be embodied, I am enabled to take up the strains due to intermittent or pounding loads likely to twist or otherwise distort or break the more rigid parts of mechanisms such as shown.

Having thus described my invention, I claim:

1. In a device of the character described comprising in combination a pair of annular resilient casing members separated along a plane parallel to the annulus, reinforcing material embedded in the marginal portions of the casing members, a continuous pneumatic tube encased by the said members, means contacting with the marginal portions for retaining said casing members in close relation comprising inner and outer flanged members means rigid with the flanged members engaging the reinforcing material, and adapter means rigid with both of the flanged members whereby the device may be attached to relatively movable members.

2. A shock absorber comprising in combination an annular hollow resilient member having reinforcing bands formed in the body thereof, a pneumatic tube encased by the hollow member, flanged means closely embracing the inner periphery of said hollow member, similar flanged means embracing the outer periphery thereof, means passing through the flanged means and said reinforcing bands for preventing relative movement between the flanged means and resilient member, and means rigid with the flanged members whereby the shock absorber may be attached to a pair of relatively movable members.

3. A shock absorber comprising in combination a pair of longitudinally divided casing members having metal reinforcing strips carried thereby, a pneumatic tube encased by the casing members, a flanged member embracing the outer periphery of said casing and extending along the side walls thereof, a similar flanged member embracing the inner periphery of the casing and means extending from one of the flanged members into said reinforcing strips for preventing the displacement of said casing and flanged members.

4. A device of the character described comprising a pair of annular resilient casing members separated along a plane parallel to the annulus, a continuous pneumatic tube encased by said members, inner and outer flange members, each flange member engaging both casing members to hold them together, means for preventing relative movement between the flange members and casing members, an adapter member keyed to the inner flanged member and arranged to receive a power shaft, a spider comprising a ring keyed to the outer flange member, a hub adapted to receive a power shaft and arms rigid with the hub and ring.

In testimony whereof, I hereunto affix my signature.

CLARENCE W. WALTZ.